July 22, 1941.  J. W. LOGAN, JR  2,249,965
BRAKE SYSTEM
Filed March 30, 1940   2 Sheets-Sheet 2
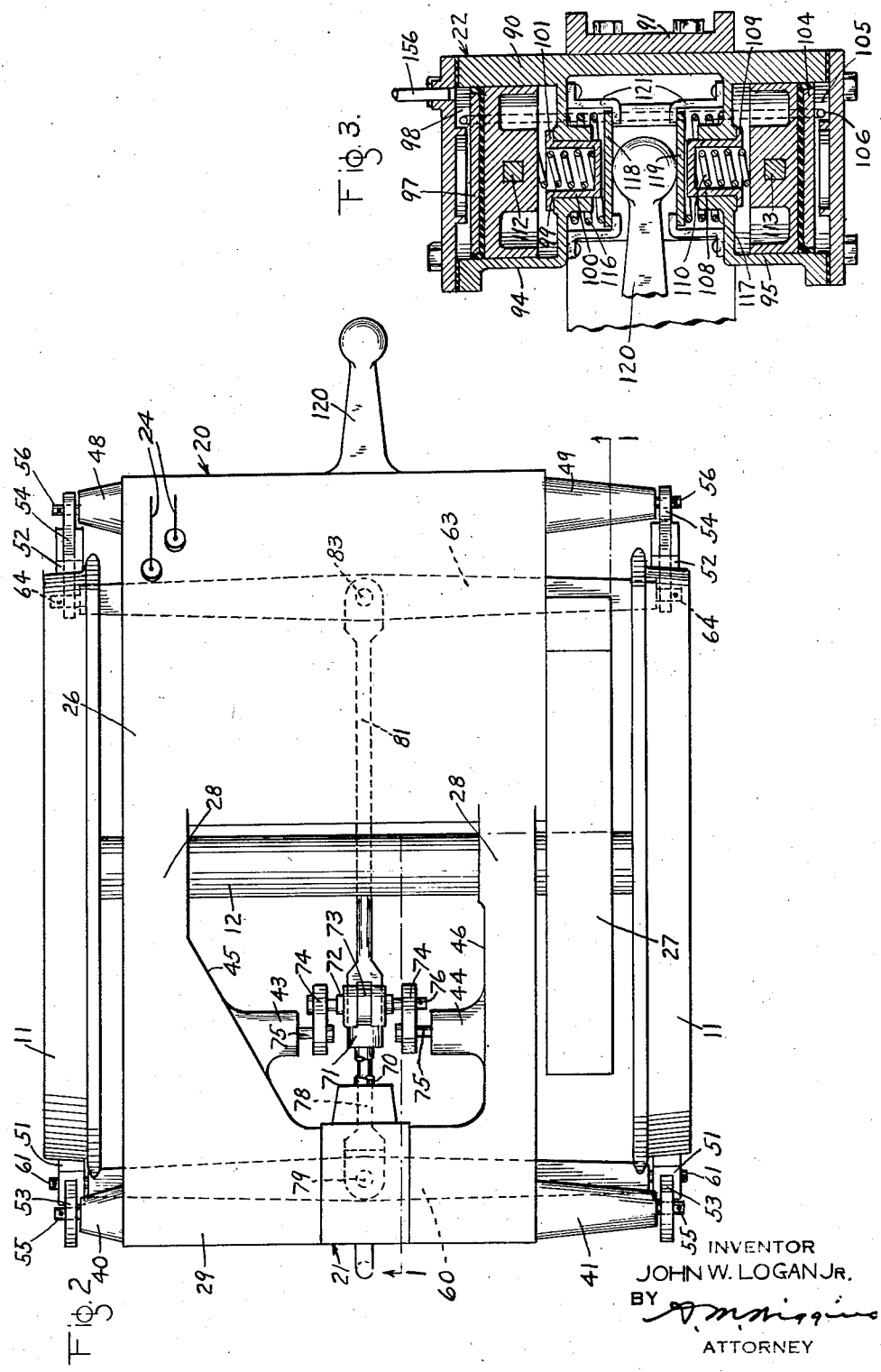
INVENTOR
JOHN W. LOGAN JR.
BY
ATTORNEY Patented July 22, 1941

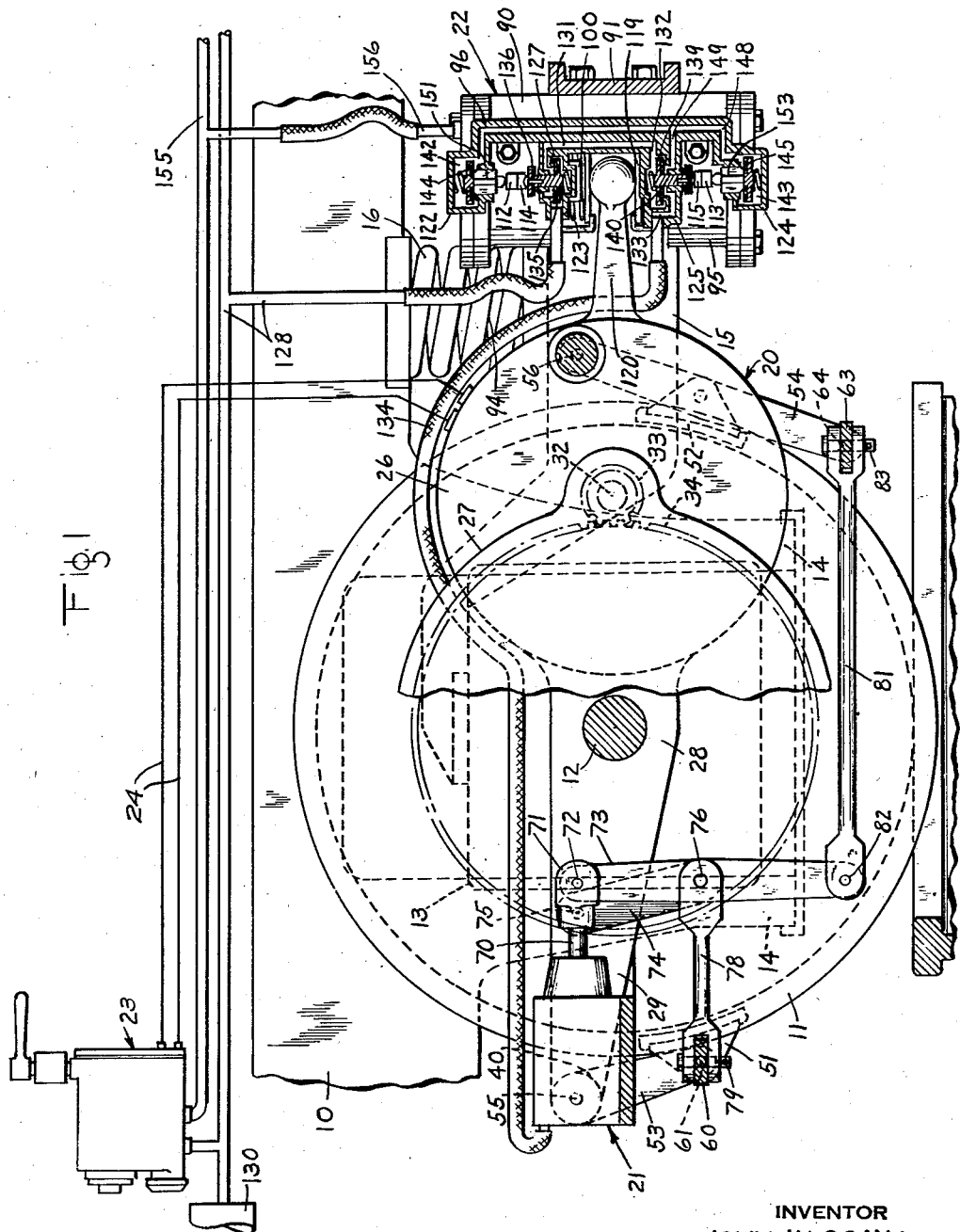

2,249,965

UNITED STATES PATENT OFFICE 2,249,965

BRAKE SYSTEM

John W. Logan, Jr., Forest Hills, Pa., assignor to The Westinghouse Air Brake Company, Wilmerding, Pa., a corporation of Pennsylvania Application March 30, 1940, Serial No. 327,028

9 Claims. (Cl. 303—3)

This invention relates to brakes for railway vehicles, and more particularly to a combined fluid pressure and dynamic brake equipment for a motor driven railway vehicle.

In the construction of a driving motor truck for an electric railway vehicle, it is customary to provide a traction motor casing which is journaled on and partly supported by an axle of the truck, and which is operatively connected with the axle through the medium of a constantly meshed pinion and gear assembly. The traction motor may be designed for operation as a dynamic brake in conjunction with the usual fluid pressure brake, in which case it is necessary to provide brake control means for effecting operation of the two brake means in the desired sequence. Since the efficiency of a dynamic brake decreases with the speed of the vehicle, the brake control means is preferably constructed and arranged to effect suppression of the fluid pressure brake while the dynamic brake is operative to apply the required braking force to the vehicle wheels, and to effect an application of the fluid pressure brake after the speed of the vehicle has been reduced to a low value.

It is an object of the present invention to provide a combined dynamic and fluid pressure brake system including improved means for regulating the application of the fluid pressure brake apparatus in accordance with the braking effect produced by the dynamic brake means, the regulating means comprising a fluid pressure brake controlling valve device responsive to braking torque resulting initially from operation of the dynamic brake.

Another object of the invention is to provide an improved dynamic and fluid pressure brake equipment for the truck of the motor driven vehicle, comprising a frame structure journaled on an axle of the vehicle and carrying both the traction motor arranged for dynamic braking and the brake cylinder and rigging elements of the fluid pressure brake apparatus, together with a brake controlling valve device mounted on the truck and operatively connected with the frame structure for controlling operation of the fluid pressure brake means in accordance with the total braking torque produced during an application of the brakes.

A further object of the invention is to provide a combined dynamic and fluid pressure brake equipment of the type just described, in which the brake controlling valve device is responsive not only to braking torque set up by operation of the dynamic brake, but also to the pressure of fluid in a control pipe.

Other objects and advantages of the invention will appear in the following more detailed description thereof, taken in conjunction with the accompanying drawings, wherein Fig. 1 is a schematic elevational view, mainly in section, of a dynamic and fluid pressure brake equipment constructed in accordance with a preferred embodiment of my invention;

Fig. 2 is a fragmentary plan view illustrating a portion of the brake equipment shown in Fig. 1. It should be understood that Fig. 1 is taken substantially along the line 1—1 of Fig. 2; and Fig. 3 is an enlarged detail sectional view of the cylinder portion of the control valve device shown in Fig. 1.

Description

In Fig. 1 of the drawings is illustrated a portion of a railway truck including a frame 10, and one of a pair of wheels 11 suitably secured to an axle 12, which is journaled in a journal box structure 13 that is slidably guided between a pair of pedestal portions 14 of the frame. Mounted on the journal box 13 is one end of an equalizer bar 15, which together with a companion equalizer bar, not shown, is arranged to support the frame 10 through the medium of truck springs such as that indicated at 16. For applying braking force to the wheels there is provided a combined dynamic and fluid pressure brake system, which includes a traction motor 20, a brake cylinder device 21, a brake regulating valve device 22, and a manually operable brake controller device 23, which is constructed and arranged to control application and release of both the dynamic and fluid pressure brake mechanisms, as hereinafter explained.

The traction motor 20 may be of any suitable type, and has associated therewith the necessary electrical circuits, illustrated in diagrammatic form as including conductors 24, through the medium of which the manually operable brake controller 23 is adapted to effect operation of the motor as a dynamic brake. The motor 20 is mounted in a frame structure, which as shown in Figs. 1 and 2, comprises a motor housing portion 26, a gear casing portion 27, a pair of centrally disposed bearing portions 28 which are journaled on the axle 12, and a brake carrier portion 29 extending from the bearing portion and arranged on the opposite side of the axle with respect to the motor housing portion 26. As shown in Fig. 1, the shaft 32 of the motor 20 is provided with a pinion 33 which is mounted in constantly meshed relation with a gear 34 that is suitably secured to the axle 12 of the vehicle truck. It will thus be apparent that the frame structure including the portions 26, 28 and 29 is pivotally mounted with respect to the axle 12 and supports the traction motor 20 in driving relation with the wheels 11.

According to my invention, the carrier portion 29 of the frame structure has formed therein a cradle-like depression for receiving the brake cylinder device 21, which is bolted or otherwise suitably secured therein by means not shown in the drawings, and extends longitudinally of the truck. As is best shown in Fig. 2 of the drawings, the carrier portion 29 has formed on opposite sides thereof a pair of brackets 40 and 41 which project outwardly substantially into the planes of the respective wheels 11. Formed on interior surfaces 45 and 46 of the frame structure extending between the portions 28 and 29 are a pair of brackets 43 and 44, which are disposed at opposite sides of the axis of the brake cylinder device 21. Carried on the motor housing portion 26 of the frame structure are brackets 48 and 49, which are similar to brackets 40 and 41 and extend outwardly into the planes of the wheels 11.

Referring to Fig. 2, each of the wheels 11 has associated therewith a pair of brake shoe elements 51 and 52, which are hung from the motor frame structure by means of hanger levers 53 and 54, respectively. The hanger levers 53 are suspended from pins 55 carried by the respective brackets 40 and 41, and the hanger levers 54 are similarly mounted on pins 56 secured to the brackets 48 and 49, respectively. A transversely disposed brake beam 60 is pivotally connected to the two brake shoe elements 51 through the medium of pins 61. In a similar manner the brake shoe elements 52 are connected together through the medium of a brake beam 63, the opposite ends of which are pivotally connected to the lower ends of the respective hanger levers 54 by means of pins 64.

The brake cylinder device 21 is of the usual type containing a piston, not shown, which is adapted to operate a piston rod 70, the outer end of which carries a clevis member 71 which is pivotally connected by means of a pin 72 to the upper end of a vertically disposed brake lever 73. A pair of hanger members 74 are provided for supporting the lever 73, the upper ends of the hanger members being pivotally mounted on pins 75 carried by the respective brackets 43 and 44, and the opposite ends of the hanger members being journaled on a rod 76, which, as is best shown in Fig. 1, extends through a suitable aperture formed in the central portion of the lever 73. Also pivotally connected to the rod 76 is one end of a pull rod 78, the opposite end of which is pivotally connected to a pin 79 carried by the brake beam 60 intermediate the ends thereof. The lower end of the brake lever 73 is operatively connected with the brake beam 63 through the medium of a tie rod 81, one end of which is journaled on a pin 82 secured to the brake lever and the other end of which is pivotally connected to the brake beam by means of a pin 83.

The brake regulating valve device 22 may be of any suitable type constructed and arranged to respond to displacement of the frame structure of the motor 20 for controlling the supply and release of fluid under pressure to and from the brake cylinder device 21, and as illustrated in the drawings is similar to that shown and described in the copending application of Burton S. Aikman, filed in the United States Patent Office January 31, 1940, Serial No. 316,560. Referring to Fig. 1 of the drawings, the brake controlling valve device 22 includes a casing structure 90, which is bolted or otherwise secured to a transversely disposed member 91 connected to the truck equalizer bar 15. Forming parts of the casing structure 90 are upper and lower cylinder portions 94 and 95, and a vertically arranged valve casing section 96, which is carried by the cylinder portions.

As is best shown in Fig. 3, the cylinder portions 94 and 95 of the casing structure 90 are spaced apart and are disposed in coaxial alignment. The cylinder portion 94 has a piston bore within which is slidably mounted a piston 97, which is subject to the pressure of fluid in a piston chamber 98, and to the opposing pressure of a spring 99 that is interposed between the piston and a plunger member 100. The plunger member 100 is slidably mounted in a vertical bore formed in the piston portion 94 and normally projects outwardly thereof, downward movement of the member being limited by a collar 101. Similarly, the cylinder portion 95 of the casing structure has operatively mounted therein a piston 104, which is subject to the pressure of fluid in a chamber 105 that communicates by way of a passage 106 with the piston chamber 98. Slidably mounted in a substantially vertical bore formed in the casing portion 95 is a plunger member 108, which projects outwardly thereof in coaxial alignment with the plunger member 100 and has an annular collar 109 for limiting outward movement thereof under the force exerted by a coil spring 110, which is interposed between the piston 104 and the plunger member.

Interposed between the spaced cylinder portions 94 and 95 is a torque arm 120, which is carried by the motor housing portion 26 of the frame structure, and which is normally yieldingly supported through the medium of a pair of centering springs 116 and 117, which respectively bear against the cylinder portions and two follower plates 118 and 119 engaging a rounded end of the torque arm. Suitable stop members 121 may be secured to the cylinder portions for retaining the plates when the torque arm is carried out of the normal position, as hereinafter explained.

The pistons 97 and 104 have suitable recesses formed therein for receiving laterally projecting lugs 112 and 113, respectively. As is shown in Fig. 1, the lugs 112 and 113 extend outwardly through vertical grooves 114 and 115, which are formed in the cylinder portions 94 and 95, respectively.

The valve portion 96 of the casing structure 90 has formed thereon a pair of extensions 122 and 123 which are respectively disposed above and below the projecting lug 112, and a similar pair of extensions 124 and 125 which are arranged on opposite sides of the lug 113. Formed in the extension 123 is a supply valve chamber 127, which communicates by way of a supply pipe 128 with a supply reservoir 130. The supply valve chamber 127 also communicates by way of a passage 131 with a supply valve chamber 132, which is formed within the extension 125 and communicates through a passage 133 and a flexible conduit 134 with the piston chamber of the brake cylinder device 21.

Disposed in the valve chamber 127 is a spring pressed supply valve 135 having a stem 136 slidably mounted in a bore extending into operative alignment with the movable lug 112, which is arranged to effect unseating of the valve 135 when moved downwardly as hereinafter explained. The valve 135 is normally held in seated position for closing communication between the valve chamber 127 and the passage 131. A similar supply valve 139 is mounted within the valve chamber 132 and is normally held in seated position under the force of a suitable spring for closing communication between that chamber and the passage 133. A stem 140 secured to the valve 139 is slidably mounted in a suitable bore and extends outwardly of the casing extension 125 into operative alignment with the lug 113. It will be apparent that the valve elements 135 and 139 are so arranged that, while either of the valves is seated, communication from the supply pipe 128 to the brake cylinder device 21 is closed.

Formed in the casing extensions 122 and 124 are valve chambers 142 and 143, within which are mounted release valves 144 and 145, respectively. These valves are biased to their seated positions by suitable springs and control communications from the respective valve chambers to the atmosphere. The valve chambers 142 and 143 are connected together by way of a passage 148, which in turn communicates by way of a branch passage 149 with the passage 133 and consequently with the brake cylinder device 121. The valve element 144 has a fluted stem 151 slidably mounted in a bore formed in the casing structure, which stem is arranged for engagement with the upper surface of the movable lug 112. As shown in Fig. 1, the lug 112 is normally positioned for maintaining the valve element 124 in unseated position against the force exerted by the associated spring. The release valve 145 likewise has a fluted stem 153 slidably mounted in a bore connecting the valve chamber 143 with the atmosphere, the outer end of the stem being disposed in operative alignment with the lower surface of the lug 113, which is normally biased to its lowermost position for holding the valve in unseated position.

The brake controller 23 is not illustrated in detail, but it will be understood that this device is of the manually operated type including a circuit controlling portion operative through the medium of the conductors 24 to condition the traction motor 20 for operation as a dynamic brake, and a self-lapping brake valve portion operative simultaneously with the circuit controlling portion for controlling the pressure of fluid in a control pipe 155, which communicates by way of a branch pipe 156 with the piston chamber 98 of the brake controlling valve device 22, as shown in Fig. 3. It will be understood that the control pipe 155 and the main reservoir supply pipe 128 may extend throughout a train made up of vehicles equipped with brake apparatus constructed in accordance with the invention.

*Operation*

With the vehicle brake apparatus in release position, as shown in the drawings, the control pipe 155 is connected to the atmosphere through suitable communications in the brake controller device 23, so that the pistons 97 and 104 in the brake controlling valve device 22 are held in their outermost positions by the respective springs 99 and 110 shown in Fig. 3, while the lugs 112 and 113 are consequently positioned as shown in Fig. 1. The lugs 112 and 113 are thus adapted to maintain the release valves 144 and 145 in unseated position for connecting the piston chamber of the brake cylinder device 21 to the atmosphere. At the same time, the spring pressed supply valves 135 and 139 are maintained in their seated positions as illustrated in Fig. 1. With the brakes thus released, electric current may be supplied in the usual manner to the traction motor 20 for driving the vehicle.

Let is now be assumed that the vehicle is being operated along the track toward the left-hand, as viewed in Fig. 1, so that the wheel 11, axle 12 and gear 34 are rotated in a counterclockwise direction, and that the motorman operates the usual motor controller, not shown, to cut off the supply of current to the traction motor 20, and then moves the brake controller device 23 to a brake application position for effecting an application of the brakes. Upon operation of the brake controller device 23, the circuit controller portion thereof is actuated to connect the conductors 24 and the windings of the traction motor 20 into a dynamic braking circuit in the well known manner, while the brake valve portion of the controller device is simultaneously actuated to cause supply of fluid under pressure from the supply pipe 128 to the straight air pipe 155.

When the traction motor 20 is thus connected into a dynamic braking circuit it becomes operative to resist the counterclockwise rotation of the gear 34 and the axle 12 and wheel 11 associated therewith, so that the frame structure including the housing portion 26 and carrier portion 29 is subjected to a reactive force, which may be termed dynamic braking torque, which tends to cause tilting of the frame structure about the axle 12 in a counterclockwise direction. As the motor frame structure is thus tilted about the axle, the torque arm 120 thereon is carried upwardly against the plunger member 100 of the brake controlling valve device 22.

Meanwhile, fluid under pressure supplied to the control pipe 155 by operation of the brake controller device 23 flows through the branch pipe 156 to the piston chamber 98 of the brake controller device, shown in Fig. 3, and also flows from that chamber through the passage 106 to the lower piston chamber 105. The pressure of fluid thus admitted to the connected piston chambers then forces the pistons 97 and 104 inwardly, against the force of each of the springs 99 and 110, until the pistons are brought into engagement with the respective plunger elements 100 and 108.

Referring to Fig. 1, as the pistons within the cylinder portions 94 and 95 of the brake controlling valve device 22 are thus moved inwardly in response to the increase in pressure of the fluid in the control pipe 155 and branch pipe 156, the laterally projecting lugs 112 and 113 are thereby moved into engagement with the valve stems 136 and 140, respectively. The piston carrying the lug 113 then continues upward movement until the supply valve 139 is moved away from its seat. No fluid under pressure is supplied to the brake cylinder device at this time, however, since the other supply valve 135 is held in seated position due to the fact that the piston carrying the lug 112 is prevented from moving far enough to effect unseating of that valve by the dynamic brake torque transmitted through the medium of the torque arm 120 and plunger member 100. It will thus be apparent that so long as the speed of the vehicle is high enough to render the motor 20 operable to effect dynamic braking to the desired degree, as measured by the result of dynamic braking torque reacting on the frame structure in which the motor is mounted, the associated fluid pressure brake apparatus is suppressed or prevented from becoming effective, although fluid under pressure is supplied through the straight air pipe for conditioning the fluid pressure brake apparatus for immediate operation in the event of failure of the dynamic brake means.

As the speed of the vehicle subsequently declines under the effect of dynamic braking force produced by operation of the traction motor 20 as already explained, the efficacy of the motor as a dynamic brake is correspondingly reduced, until the dynamic braking torque transmitted through the medium of the torque arm 20 to the plunger member 100 of the brake controlling valve device 22 is no longer effective to resist downward movement of the piston carrying the lug 112 under the pressure of fluid in the straight air pipe 155, whereupon the plunger is brought into operative engagement with the stem 136 for unseating the supply valve 135. With both the supply valves 135 and 139 thus unseated, fluid under pressure is quickly supplied from the supply pipe 128, by way of the valve chamber 127, passage 131, valve chamber 132, passage 133, and conduit 134, to the piston chamber of the brake cylinder device 21.

The pressure of fluid acting on the usual brake cylinder piston then forces the piston rod 70 outwardly, thereby operating the brake lever 73 to pull the brake shoes 51 and 52 into braking engagement with the respective wheels 11. The fluid pressure brake apparatus is thus rendered operative to take over the application of braking force to the vehicle wheels in order to bring the vehicle to a stop.

When the brake shoes 51 and 52 are thus moved into braking relation with the wheels 11, the frame structure including the motor housing 26 and carrier portion 29 is again subjected to a reactive force, which may be termed mechanical braking torque, which force tends to cause rotation of the frame structure in a counterclockwise direction about the axle 12, still assuming that the wheels 11 are rotating in the same direction. Thus if the braking effect produced by the supply of fluid under pressure to the brake cylinder device 21 as just explained should become excessive, or should approach a predetermined value presaging sliding of the wheels, the resultant mechanical braking torque transmitted through the medium of the torque arm 120 to the plunger member 120 of the brake controlling device 22 will overcome the downward pressure exerted by straight air pipe pressure on the piston carrying the lug 112, so that the supply valve 135 will again be moved to its seat for cutting off further flow of fluid under pressure to the brake cylinder device 21.

If the braking force applied to the wheels is still excessive, continued movement of the piston carrying the plunger 112, under the mechanical braking torque exerted through the medium of the torque arm 120, will then cause unseating of the discharge valve 144. Fluid under pressure is thereupon released from the brake cylinder device 21 by flow through the conduit 134, passage 149, passage 148 and past the unseated discharge valve 144, so that a partial release of the brakes is effected. The mechanical braking torque reacting on the frame structure including the torque arm 120 is thereby lessened, the piston carrying the lug 112 then being moved downwardly again to permit closing of the discharge valve 144. It will be thus seen that the brake controlling valve device 22 is constructed and arranged to regulate the operation of the fluid pressure brake apparatus in accordance with the reactive braking torque produced and also in accordance with the pressure of fluid in the control pipe 155.

It will now be evident that the combination dynamic and fluid pressure brake equipment embodying my invention, and including the frame structure pivotally mounted on an axle and supporting the dynamic braking motor and elements of the fluid pressure brake mechanism, may be constructed and arranged to provide automatic regulation of operation of the fluid pressure brake apparatus in accordance with the total braking torque produced during a brake application, and also in accordance with a control pressure. With a brake system having the features of my invention, the initial braking torque created upon operation of the dynamic brake is utilized for suppressing operation of the fluid pressure brake until the speed of the vehicle has been brought to a predetermined value, which is determined by the speed required for effective dynamic braking, after which the fluid pressure brake apparatus is rendered operative to cause further deceleration of the vehicle at the selected rate.

Although a preferred embodiment of the invention has been illustrated and described, it is not intended to limit the scope of the invention to that embodiment or otherwise than by the terms of the appended claims.

Having now described my invention, what I claim as new and desire to secure by Letters Patent, is:

1. In a brake controlling system for a vehicle of the type equipped with dynamic braking means and fluid pressure braking means, in combination, a control pipe, brake controller means manually operable to initiate operation of said dynamic brake while effecting an increase in the pressure of fluid in said control pipe to a value corresponding to the selected degree of application of the brakes, brake controlling valve means subject to the pressure of fluid in said control pipe for controlling the supply and release of fluid under pressure to and from said fluid pressure brake means, and a brake carrier member pivotally mounted on the vehicle and operatively responsive to the braking torque produced by operation of said dynamic brake means, said member being constructed and arranged to prevent operation of said brake controlling valve device to supply fluid under pressure to said fluid pressure brake means during the initial stages of operation of said dynamic brake means.

2. In a brake controlling system for a railway vehicle of the type equipped with a dynamic brake means and a fluid pressure brake means, in combination, a control pipe, brake controller means manually operable to initiate operation of said dynamic brake means to apply braking force to the vehicle while effecting an increase in the pressure of fluid in said control pipe corresponding to the desired degree of application of the brakes, control valve means operable to effect supply and release of fluid under pressure to and from said fluid pressure brake means, a movable brake carrier member constructed and arranged to respond to braking torque produced by operation of said dynamic brake means, and means subject to the opposing forces of braking torque on said member and the fluid pressure in said control pipe for controlling the operation of said valve means.

3. In a brake controlling system for a railway vehicle of the type equipped with dynamic brake means and fluid pressure brake means, in combination, a brake controlling valve device operable to control application and release of said fluid pressure brake means, a manually operable brake controller constructed and arranged for simultaneously controlling said dynamic brake means and said brake controlling valve device, and torque means responsive to braking torque produced by operation of both said dynamic and fluid pressure brake means for regulating operation of said brake controlling valve device.

4. A combination dynamic and fluid pressure brake system for railway vehicle comprising dynamic brake means, fluid pressure brake means, manually operable brake controller means operatively interlocked with both said dynamic brake means and said fluid pressure brake means and selectively operative to effect any desired degree of application of the brakes, torque means for measuring the total braking torque produced during operation of either or both of said two brake means, and a brake controlling valve device automatically operative to regulate the application and release of said fluid pressure brake means in accordance with the braking torque reacting on said torque means, for ensuring a substantially constant application of the brakes to a degree corresponding with the setting of said brake controller means.

5. A brake equipment for a railway vehicle having a wheel and axle assembly, comprising a frame structure pivotally mounted on said wheel and axle assembly, dynamic brake means carried by said frame structure and operatively connected to said assembly, fluid pressure brake means carried by said frame structure and arranged to apply braking force to said assembly, controller means for conditioning both said dynamic and fluid pressure brake means for operation, and a brake controlling valve device responsive to braking torque reacting on said frame structure for also controlling said fluid pressure brake means.

6. A brake equipment for a railway truck having a wheel and axle assembly, comprising a frame structure pivotally mounted on the axle of said assembly and having a motor housing portion and a carrier portion disposed on opposite sides of said axle, a motor operative to effect dynamic braking mounted in said housing portion, a fluid pressure brake cylinder device secured to said carrier portion, friction brake mechanism hung from said frame structure and operatively connected to said brake cylinder device, a brake controlling valve device carried by said truck and operative to control the pressure of fluid operating said brake cylinder device, and a torque arm operatively connecting said frame structure with said brake controlling valve device, said arm being arranged to respond to braking torque reacting on said frame structure for conditioning said brake controlling valve device to withhold operation of said friction brake mechanism while said dynamic brake means is operative to produce a selected braking effect, and to initiate and regulate an application of the friction brakes when the braking effect produced by said dynamic brake means declines below said selected value.

7. In a brake controlling system for a railway vehicle of the type equipped with dynamic brake means and fluid pressure brake means, in combination, a brake controlling valve device operable to control application and release of said fluid pressure brake means, a control pipe in which the pressure of fluid is varied to any selected degree, and torque means governed by the pressure of fluid in said pipe and by the braking torque produced by operation of either or both said dynamic brake means and said fluid pressure brake means for regulating operation of said brake controlling valve means.

8. A brake equipment for a railway vehicle having a wheel and axle assembly, comprising a frame structure pivotally mounted on said wheel and axle assembly, dynamic brake means carried by said frame structure and operatively connected to said assembly, fluid pressure brake means carried by said frame structure and arranged to apply braking force to said assembly, a pipe in which the pressure of fluid is varied to any selected degree, means for varying the pressure in said pipe and for conditioning said dynamic brake means for operation, and means governed by the pressure of fluid in said pipe and also by the braking torque reacting on said frame structure for controlling said fluid pressure brake means.

9. A brake system for railway vehicles comprising, in combination, a pipe in which the pressure of fluid is varied to control applications of the vehicle brakes, a rockable brake carrier mechanism associated with a wheel and axle assembly of the vehicle, dynamic brake means carried by said mechanism, fluid pressure brake means also carried by said mechanism, said mechanism being rockable under the torque reaction due to operation of either or both of said brake means for governing the cooperative effect thereof, and means governed by the pressure of fluid in said pipe for opposing the rocking movement of said mechanism.

JOHN W. LOGAN, Jr.